United States Patent
Gahleitner et al.

(10) Patent No.: US 11,084,920 B2
(45) Date of Patent: *Aug. 10, 2021

(54) HETEROPHASIC POLYPROPYLENE COMPOSITION

(71) Applicant: BOREALIS AG, Vienna (AT)

(72) Inventors: Markus Gahleitner, Linz (AT); Jingbo Wang, Linz (AT); Klaus Bernreitner, Linz (AT); Pauli Leskinen, Linz (AT); Johanna Lilja, Linz (AT)

(73) Assignee: BOREALIS AG, Vienna (AT)

( * ) Notice: Subject to any disclaimer, the term of this patent is extended or adjusted under 35 U.S.C. 154(b) by 0 days.

This patent is subject to a terminal disclaimer.

(21) Appl. No.: 16/769,510

(22) PCT Filed: Dec. 18, 2018

(86) PCT No.: PCT/EP2018/085368
§ 371 (c)(1),
(2) Date: Jun. 3, 2020

(87) PCT Pub. No.: WO2019/121599
PCT Pub. Date: Jun. 27, 2019

(65) Prior Publication Data
US 2021/0047502 A1    Feb. 18, 2021

(30) Foreign Application Priority Data
Dec. 18, 2018  (EP) .................................. 17208983

(51) Int. Cl.
*C08L 23/14* (2006.01)

(52) U.S. Cl.
CPC .......... *C08L 23/14* (2013.01); *C08L 2205/025* (2013.01); *C08L 2205/24* (2013.01); *C08L 2314/06* (2013.01)

(58) Field of Classification Search
CPC .............. C08L 23/14; C08L 2205/025; C08L 2205/24; C08L 2314/06; C08L 2201/10; C08L 2308/00; C08L 23/142; C08F 4/65912; C08F 210/06
See application file for complete search history.

(56) References Cited

U.S. PATENT DOCUMENTS

| | | | | |
|---|---|---|---|---|
| 5,753,769 | A * | 5/1998 | Ueda ...................... | C08F 10/06 525/323 |
| 6,191,223 | B1 * | 2/2001 | Dolle ...................... | C08L 23/14 525/191 |
| 9,777,142 | B2 * | 10/2017 | Sandholzer ............. | C08L 23/16 |
| 10,800,910 | B2 * | 10/2020 | Gahleitner et al. ... | C08F 210/06 |

FOREIGN PATENT DOCUMENTS

| | | |
|---|---|---|
| EP | 0887379 A | 12/1998 |
| EP | 2787034 A1 | 10/2014 |
| EP | 2824142 B1 | 1/2015 |
| EP | 2886563 B1 | 6/2015 |
| EP | 3168261 A1 | 5/2017 |
| WO | 92/12182 | 7/1992 |
| WO | 2001/092406 A1 | 12/2001 |
| WO | 2006/018812 A1 | 2/2006 |
| WO | 2013/007650 | 1/2013 |
| WO | 2016/162359 A1 | 10/2016 |
| WO | 2017/005667 A1 | 1/2017 |

OTHER PUBLICATIONS

Jenkins, A.D., et al., "Glossary of Basic Terms in Polymer Science", Pure Appl. Chem., vol. No. 68, 8, pp. 1591-1595, 1996.
Monrabal, B., et al., "Soluble Fractoin Analysis in Polypropylene: Characterization of the whole polymer, amorphous and crystalline fractions in a Quality Control Laboratory", Polymer Char, 2013. pp. 1-4.
Monrabal, et al., "Soluble Fraction Analysis in Polypropylene", The Column, www.chromatographyonline.com, pages 1-6.

* cited by examiner

*Primary Examiner* — Irina S Zemel
(74) *Attorney, Agent, or Firm* — Tarolli, Sundheim, Covell & Tummino LLP

(57) ABSTRACT

The invention relates to a new soft heterophasic propylene copolymer with increased melting temperature, improved stiffness and optical properties, as well as the process by which the heterophasic propylene copolymer is produced. Further the present invention is directed to articles made of the inventive heterophasic propylene copolymer, particularly to blow moulded, extrusion blow moulded or injection moulded articles and their use in e.g. medical, pharmaceutical or alimentary applications.

16 Claims, 1 Drawing Sheet

Schematic diagram of the CRYSTEX QC instrument and results (schematic):
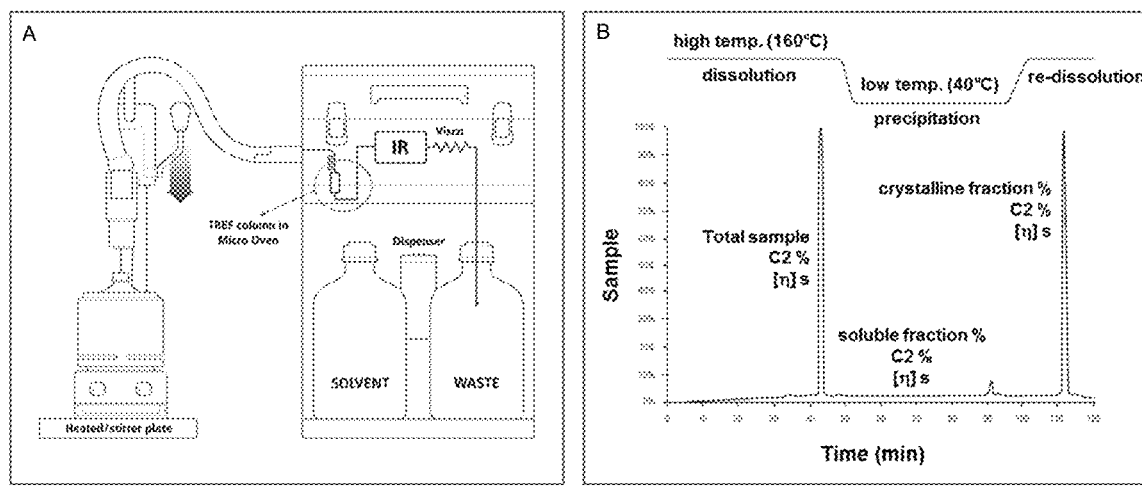

HETEROPHASIC POLYPROPYLENE COMPOSITION

The present invention relates to a new soft heterophasic polypropylene composition with improved stiffness and optical properties, as well as to the process by which the heterophasic polypropylene composition is produced. Further the present invention is also directed to articles made from the inventive heterophasic polypropylene composition, particularly to blow moulded, extrusion blow moulded or injection moulded articles.

BACKGROUND INFORMATION

Polyolefins, like polypropylene, are increasingly used in different demanding applications. At the same time there is a continuous search for tailored polymers which meet the requirements of these applications. For instance, heterophasic systems are known for their good impact behavior. Such heterophasic propylene copolymers comprise a matrix being either a propylene homopolymer or a random propylene copolymer in which an elastomeric copolymer is dispersed. Thus the polypropylene matrix contains (finely) dispersed inclusions being not part of the matrix and said inclusions contain the elastomeric copolymer. The term "inclusion" according indicates that the matrix and the inclusion form different phases within the heterophasic system, said inclusions are for instance visible by high resolution microscopy, like electron microscopy or atomic force microscopy, or can be identified by dynamic mechanical thermal analysis (DMTA). Specifically in DMTA the presence of a multiphase structure can be identified by the presence of at least two distinct glass transition temperatures.

Soft heterophasic propylene copolymers are very suitable for the application in the field of extrusion blow moulded (EBM) articles, such as bottles or hollow containers. Soft heterophasic propylene copolymers are further very suitable for producing squeezable articles as e.g used for medical, pharmaceutical or diagnostic applications. For these articles, good optical properties in the sense of low haze and/or good clarity are required.

It is very common to use or produce such extrusion blow moulded articles in a blow-fill-seal process (BFS).

Currently such blow-fill-seal (BFS) bottles are mainly made from low-density polyethylene (LDPE) due to its excellent processability, good transparency and good softness for collapsible bottles in combination with the highest possible purity. The purity partly results from the fact that this type of polymer does not need many additives in general, partly from the absence of catalyst residues. However, the main issue is the low melting temperature of LDPE grades themselves.

Wherever applications require sterilisation, especially steam sterilisation, the low melting temperature of LDPE limits the steam sterilisation to a temperature significantly below said melting temperatures, Accordingly the time required for proper sterilisation is extended. Longer sterilisation time however requires more energy. Furthermore, the optical properties of LDPE after sterilisation deteriorate heavily due to post-crystallization and surface roughening in the process.

For medical applications, the retention of the optical properties after sterilisation is even more important. Heterophasic systems which enable a skilled person to produce sterilisable extrusion blow moulded articles like BFS bottles with high clarity are, however, still a challenge.

Description of the Prior Art

EP 2824142 B1 claims heterophasic polypropylene copolymers based on a single-site catalyst (SSC) having a melt flow rate (MFR) in the range of 0.5-100 g/10 min, comprising a fraction soluble in cold xylene (XCS) in an amount of 12-60 wt.-%, said XCS fraction being further characterised by an ethylene content of 18-70 wt.-% and an intrinsic viscosity (IV) which is higher than the IV of the fraction insoluble in in cold xylene (XCI). No optical properties are indicated for the respective polymers, and neither haze nor softness can be expected in a suitable range.

EP 2886563 B1 claims bimodal ethylene-propylene random copolymers for extrusion blow moulded (EBM) bottles with good transparency but limited softness and collapsibility.

WO 2016162359 A1 covers blends of an ethylene-propylene random copolymer based on SSC characterised by a relatively low melting point in the range of 125-143° C. and a relatively high XCS fraction with 10-30 wt.-% of a predominantly amorphous elastomer. Said elastomer is preferably a styrene block copolymer being completely soluble in cold xylene, resulting in a very high total XCS content which, together with the low melting point, makes the respective compositions unsuitable for the applications targeted here.

WO 2017005667 A1 claims random-heterophasic copolymers based on Ziegler-Natta type catalysts (ZNC) comprising a fraction soluble in cold xylene (XCS) in an amount of 25-35 wt.-% said XCS fraction being further characterised by an ethylene content of 12-22 wt.-%. In relation to the softness of said compositions, the XCS content is rather high and makes them unsuitable for the applications targeted here.

WO 2001092406 A1 describes propylene polymer compositions comprising (A) 70-90 wt.-% of a random copolymer of propylene with ethylene, containing 1-6 wt.-% of ethylene, having a content of fraction insoluble in xylene at room temperature (XCI) of not less than 93%; (B) 10-30 wt.-% of a copolymer of propylene with ethylene, containing 8-18 wt.-% of ethylene; wherein the ratio (B)/$C_2$B of the percent by weight of (B), with respect to the total weight of (A) and (B), to the percent by weight of ethylene in (B), with respect to the total weight of (B), represented in the above formula by $C_2$B, is 2.5 or lower. The respective compositions exhibit a rather higher haze already before sterilisation and a melting point below 150° C., both phenomena being in conflict to the presently targeted applications.

WO 2006018812 A1 claims a stretch blow moulded container comprising a propylene polymer composition produced with a metallocene catalyst, the propylene polymer composition comprising (i) 25.0-75.0 wt.-% of a homopolymer or mini-random copolymer of propylene containing up to 1.0 wt.-% of at least one of ethylene and C4-C10 alpha-olefins, having an isotactic index greater than about 80%; and (ii) 25.0-75.0 wt.-% of a random copolymer of propylene and at least one olefin chosen from ethylene and C4-C10 alpha-olefins, containing about 0.3 to about 30 wt.-% of said olefin, and having an isotactic index greater than about 60%; wherein the propylene polymer composition has an MFR of 1-50 g/10 min and a molecular weight distribution (Mw/Mn) of less than 3.5. While no standard parameters for mechanical and optical performance of the claimed compositions are indicated, the haze of the inventive bottles is only at the same level as the comparative ZNC-based example, while the impact strength is worse.

Random heterophasic propylene copolymers (RAHE-COs) are very suitable for soft applications.

This is especially true for polymers produced via metallocene catalysis (SSC). Such polymers provide good optical properties in the sense of low haze and high clarity. However, there are two main drawbacks of SSC based materials: Due to excellent comonomer insertion and chain defects, normally the melting temperature (Tm) of such SSC-based RAHECOs is rather low. Such low melting temperatures limit the processing window for sterilisation processes, especially for steam sterilisation processes.

Accordingly—as described for the case of LDPE—when the temperature for sterilisation cannot be increased, the time required for proper sterilisation needs to extended. Longer sterilisation time however requires more energy and can induce additional unwanted ageing and post-crystallization effects on the polymer.

Also owed to the highly random comonomer distribution, the metallocene based polypropylene grades tend to become much softer than Ziegler-Natta grades at a similar comonomer content, nevertheless providing lower impact behaviour.

Further, optical properties will deteriorate faster during said sterilisation processes. Polymers produced with metallocene catalysis (SSC) are also known to have a very narrow molecular weight distribution, which is known to rather impede processability in free surface processes like extrusion blow moulding (EBM).

Therefore, a new solution providing a combination of high purity, good processability and sterilisation resistance, as well as increased melting temperature and improved mechanical properties is required.

Object of the Invention

So it has been an object of the present invention to provide a heterophasic polypropylene composition with increased melting temperature, improved mechanical properties, good optical properties before and especially after sterilisation processes.

The present inventors have accordingly identified a heterophasic polypropylene composition comprising a) a crystalline matrix being a multimodal propylene random copolymer of ethylene and/or C4-C12 alpha-olefin(s) as further comonomers and b) an amorphous propylene-ethylene elastomer optionally comprising minor amounts of C4-C12 alpha-olefin(s) as further comonomers dispersed in said crystalline matrix (a), wherein the heterophasic polypropylene composition is characterised by a xylene cold solubles (XCS) fraction according to ISO 1652 in the range of 5.0 to 16.5 wt.-%,
a comonomer content of the XCS fraction (Co(XCS)) in the range of 8.0 to 16.5 wt.-%, and optionally fulfilling the inequation $0.80 \leq XCS/Co(XCS) \leq 1.20$,
wherein XCS denominates the xylene cold solubles fraction according to ISO 1652 in [wt.-%] and Co(XCS) is the comonomer content of said XCS fraction in [wt.-%].

In a particular embodiment, the invention relates to moulded articles, especially blow moulded articles and especially blow-fill-seal (BFS) articles comprising the heterophasic polypropylene composition of the present invention as well a process for producing said heterophasic polypropylene composition.

In a particular embodiment the heterophasic polypropylene composition comprises 80.0-90.0 wt.-% of a crystalline matrix (a) being a multimodal propylene random copolymer of ethylene and/or C4-C12 alpha-olefin(s) as further comonomers and 10.0-20.0 wt.-% of an amorphous propylene-ethylene elastomer (b) optionally comprising minor amounts of C4-C12 alpha-olefin(s) as further comonomers dispersed in said crystalline matrix (a), wherein the heterophasic polypropylene composition is characterised by a xylene cold solubles (XCS) fraction according to ISO 1652 in the range of 5.0 to 16.5 wt.-%, an comonomer content of the XCS fraction (Co(XCS)) in the range of 8.0 to 16.5 wt.-%, and optionally fulfilling the inequation $$0.80 \leq XCS/Co(XCS) \leq 1.20,$$

wherein XCS denominates the xylene cold solubles fraction according to ISO 1652 in [wt.-%] and Co(XCS) is the comonomer content of said XCS fraction in [wt.-%], and wherein the multimodal propylene random copolymer (a) of ethylene and or α-olefins comprises (a1) 30.0-50.0 wt.-%, based on the total weight of the heterophasic polypropylene composition, of a first polypropylene fraction being a propylene homo or propylene-ethylene random copolymer, having a comonomer content in the range of 0.0-1.0 wt.-%, and/or a melt flow rate MFR2 in the range of 2.0-10.0 g/10 min and (a2) 30.0-60.0 wt.-%, based on the total weight of the heterophasic polypropylene composition, of a second polypropylene fraction being a propylene-ethylene random copolymer, and optionally having a comonomer content in the range of above 1.0-7.0 wt.-%, and/or a melt flow rate MFR2 in the range of 0.2-2.0 g/10 min.

In a further embodiment, the invention covers the use of the heterophasic polypropylene composition for producing moulded articles, especially moulded articles intended for sterilisation purposes.

BRIEF DESCRIPTION OF THE DRAWING

FIG. 1(A) provides a schematic diagram of the CRYSTEX QC instrument; (B) Elution of an EP copolymer sample and obtained soluble and crystalline fractions in the TREF column (column filled with inert material e.g. glass beads) (see Del Hierro, P.; Ortin, A.; Monrabal, B.; 'Soluble Fraction Analysis in Polypropylene,' The Column Advanstar Publications, February 2014. Pages 18-23).

DETAILED DESCRIPTION

Heterophasic Polypropylene Composition

The heterophasic polypropylene composition comprises (a) a crystalline matrix being a multimodal propylene random copolymer of ethylene and/or C4-C12 alpha-olefin(s) as further comonomers and (b) an amorphous propylene-ethylene elastomer optionally comprising minor amounts of C4-C12 alpha-olefin(s) as further comonomers dispersed in said crystalline matrix (a), wherein the heterophasic polypropylene composition is characterised by a xylene cold solubles (XCS) fraction according to ISO 1652 in the range of 5.0 to 16.5 wt.-%,
a comonomer content of the XCS fraction (Co(XCS)) in the range of 8.0 to 16.5 wt.-%, and optionally fulfilling the inequation $0.80 \leq XCS/Co(XCS) \leq 1.20$,
wherein XCS denominates the xylene cold solubles fraction according to ISO 1652 in [wt.-%] and Co(XCS) is the comonomer content of said XCS fraction in [wt.-%].

The multimodal propylene random copolymer of ethylene and/or alpha-olefins (a) comprised in the heterophasic polypropylene composition may contain alpha-olefins selected from C4 to C8 alpha olefins, preferably from 1-butene or 1-hexene. In a preferred embodiment the multimodal propylene random copolymer of ethylene and alpha-olefins (a) comprises ethylene and 1-butene as comonomer. In an especially preferred embodiment, the multimodal propylene random copolymer (a) comprises, preferably consists of, ethylene as the sole comonomer.

The heterophasic polypropylene composition may comprise 80.0-90.0 wt.-% of the multimodal propylene random copolymer (a) of ethylene and or alpha-olefins, preferably in the range of 83.0-89.0 wt.-%, more preferably in the range of 84.0-88.0 wt.-%.

The amorphous elastomer or propylene and ethylene (b) may also comprise alpha-olefins selected from C4 to C8 alpha olefins, preferably from 1-butene or 1-hexene. In a preferred embodiment the amorphous elastomer or propylene and ethylene and alpha-olefins (b) comprises ethylene and 1-butene as comonomer.

In an especially preferred embodiment, the amorphous elastomer or propylene and ethylene (b) comprises, more preferably consists of ethylene as the sole comonomer The amount of the amorphous propylene ethylene elastomer (b) comprised in the heterophasic polypropylene composition may be in the range of 10.0-20.0 wt.-%, preferably in the range of 11.0-17.0 wt.-%, more preferably in the range of 12.0-16.0 wt.-%

The total comonomer content of the heterophasic polypropylene composition may be in the range of up to 7.0 wt.-%, like in the range of 1.0 to 7.0, preferably in the range of 2.5-6.5 wt.-%, more preferably in the range of 3.0-6.0 wt.-%.

The amount of a fraction soluble in cold xylene (XCS) in the heterophasic polypropylene composition may be in the range of 5.0 to 16.5 wt.-%, preferably in the range of 8.0-16.0 wt.-%, more preferably in the range of 9.0-15.0 wt.-%.

The comonomer content of said fraction soluble in cold xylene (Co(XCS)) may be in the range of 8.0-16.5 wt.-%, preferably in the range of 9.0-16.0 wt.-%, more preferably in the range of 10.0-15.0 wt.-%.

The fraction soluble in cold xylene (XCS) may be further characterised by its intrinsic viscosity, IV(XCS).

The IV(XCS) may be in the range of at most 2.0 dl/g, preferably in the range of 1.0-1.9 dl/g, more preferably in the range of 1.2-1.8 dl/g The heterophasic polypropylene composition is featured by a specific ratio between the fraction soluble in cold xylene (XCS) and the comonomer content of said XCS-fraction. Accordingly the ratio of XCS/Co(XCS) may be in the range of 0.80-1.20, preferably in the range of 0.85-1.15, more preferably in the range of 0.90-1.10.

The Melt Flow Rate (MFR) is determined according to ISO1133 at 230° C. and 2.16 kg loading. The MFR may be in the range of 0.3-3.5 g/10 min, preferably in the range of 0.4-3.0 g/10 min, more preferably in the range of 0.5-2.5 g/10 min.

The heterophasic polypropylene composition can be further characterised by its melting and crystallisation temperature as determined by differential scanning calorimetry (DSC), Tm and Tc respectively.

The crystallisation temperature Tc of the heterophasic polypropylene composition may be in the range of 95-112° C., preferably in the range of 98-111° C., more preferably in the range of 100-110° C.

The heterophasic polypropylene composition has a melting temperature of at least 145° C., preferably in the range of 149-160° C., more preferably in the range of 150-158° C.

It is further preferred, that the heterophasic polypropylene composition has no melting temperature between 0-135° C.

The heterophasic polypropylene composition may be also characterised by its glass transition temperature (Tg) as determined in dynamic mechanical thermal analysis (DMTA).

The glass transition temperature (Tg) may be in the range of (−15) to 0° C., preferably in the range of (−10) to 0° C., more preferably in the range of (−8) to 0° C. Preferably, the heterophasic polypropylene composition has exactly one glass transition temperature in the range between (−15) to 0° C.

The heterophasic polypropylene composition of the present invention can be alternatively described via crystalline and soluble Fractions (CF and SF) as determined by using the CRYSTEX QC method.

The heterophasic polypropylene composition may thus comprise a soluble fraction (SF) as determined in the CRYSTEX QC method in the range of 7.5-16.5 wt.-%, preferably in the range of 8.0-16.0 wt.-%, more preferably in the range of 9.0-15.0 wt.-% based on the total weight of the heterophasic polypropylene composition.

The heterophasic polypropylene composition of the present invention may consequently comprise a crystalline fraction (CF) as determined in the CRYSTEX QC method in the range of 83.5-92.5 wt.-%, preferably in the range of 84.0-92.0 wt.-%, more preferably in the range of 85.0-91.0 wt.-%.

The comonomer content of the soluble fraction (SF) as determined in the CRYSTEX QC method may be in the range of 8.0-16.5 wt.-%, preferably in the range of 9.0-16.0 wt.-%, more preferably in the range of 10.0-16.0 wt.-%.

Accordingly, the comonomer content of the crystalline fraction (CF) as determined in the CRYSTEX QC method may be in the range of 1.5-5.0 wt.-%, preferably in the range of 2.0-4.5 wt.-%, more preferably in the range of 2.5-4.0 wt.-%

The total intrinsic viscosity (IV) of the heterophasic polypropylene composition may be in the range of below 3.0 dl/g, preferably in the range of 1.5-2.8 dl/g, more preferably in the range of 1.8-2.5 dl/g.

The intrinsic viscosities of the crystalline and soluble fractions (CF and SF) of the heterophasic polypropylene composition may be different.

The intrinsic viscosity (IV) of the soluble fraction (SF) as determined in the CRYSTEX QC method may be may be in the range of up to 2.0 dl/g, preferably in the range of 1.0-1.9 dl/g, more preferably in the range of 1.2-1.8 dl/g.

The intrinsic viscosity (IV) of the crystalline fraction (CF) as determined in the CRYSTEX QC method may be in the range of <3.0 dl/g, preferably in the range of 1.5-2.8 dl/g, more preferably in the range of 1.8-2.5 dl/g a) Crystalline Matrix:

The heterophasic polypropylene composition comprises a crystalline matrix composed of a multimodal propylene random copolymer of ethylene and/or alpha-olefins.

The alpha-olefins may be selected from C4 to C8 alpha olefins, preferably from 1-butene or 1-hexene.

In a preferred embodiment, the multimodal propylene random copolymer of ethylene and or α-olefins comprises ethylene and 1-butene as comonomer.

In an especially preferred embodiment, the multimodal propylene random copolymer comprises only ethylene as the sole comonomer.

In a particularly preferred embodiment the multimodal propylene random copolymer forming the crystalline matrix consists of propylene and ethylene as sole monomers.

The term "random copolymer" has to be preferably understood according to IUPAC (Pure Appl. Chem., Vol. No. 68, 8, pp. 1591 to 1595, 1996).

The crystalline matrix may have an MFR in the range of 0.2 to 50 g/10 min, preferably in the range of 0.5 to 30 g/10 min, more preferably in the range of 1.0 to 20 g/10 min. The crystalline matrix may have a low comonomer content, namely in the range of 0.5 to 7.0 wt.-%, preferably in the range of 1.0-5.0 wt.-%, such as 1.5-3.0 wt.-%.

The crystalline matrix is multimodal. So, the crystalline matrix comprises at least two polypropylene fractions, namely a first and a second polypropylene fraction (a1 and a2), which may differ in view of their viscosity, their comonomer content, their comonomer type or more than one of these properties.

Preferably, the two polymer fractions comprised by the crystalline matrix differ in view of their comonomer content and/or their viscosities.

Accordingly it is preferred, that the first polypropylene fraction (a1) differs from the second polypropylene fraction (a2) in view of its comonomer content and its viscosity. Preferably, the comonomer content and/or the viscosity of the second polypropylene fraction is higher than the comonomer content and/or the viscosity of the first polypropylene fraction.

The first polypropylene fraction may be present in the heterophasic polypropylene composition in the range of 30.0-50.0 wt.-%, preferably in the range of 35.0-45.0 wt.-%, more preferably in the range of 37.0-42.0 wt.-%, based on the total weight of the heterophasic polypropylene composition.

The second polypropylene fraction may be present in the heterophasic polypropylene composition in the range of 30.0-60.0 wt.-%, preferably in the range of 38.0-54.0 wt.-%, more preferably in the range of 42.0-51.0 wt.-% based on the total weight of the heterophasic polypropylene composition.

The first polypropylene fraction (a1) may be a propylene homopolymer or a propylene-ethylene random-copolymer.

The comonomer content of the first polypropylene fraction may be in the range of 0.0-1.0 wt.-%, preferably in the range of 0.0-0.8 wt.-%, more preferably in the range of 0.0-0.6 wt.-%.

In a particularly preferred embodiment, the first polypropylene fraction is a propylene homopolymer.

The comonomer content of the second polypropylene fraction may be in the range of more than 1.0-7.0 wt.-%, preferably in the range of 1.5-6.5 wt.-%, more preferably in the range of 2.0-6.0 wt.-%.

The alpha-olefins used as comonomers in the first and the second polypropylene fraction may be selected from C4 to C8 alpha olefins, preferably from 1-butene or 1-hexene.

In a preferred embodiment the multimodal propylene random copolymer of ethylene and/or alpha-olefins comprises ethylene and 1-butene as comonomer.

In an especially preferred embodiment, the crystalline matrix comprises only ethylene as the sole comonomer.

The MFR of the first polypropylene fraction may be in the range of 2.0-10.0 g/10 min, preferably in the range of 2.5-8.0 g/10 min, more preferably in the range of 3.0-7.0 g/10 min.

The MFR of the second polypropylene fraction may be lower than the MFR of the first polypropylene fraction:

The MFR of the second polypropylene fraction may be in the range of 0.2 to below 2.0 g/10 min, preferably in the range of 0.3-1.5 g/10 min, more preferably in the range of 0.4-1.3 g/10 min.

b) Amorphous Propylene Ethylene Elastomer

The amorphous propylene ethylene elastomer is characterised by a low viscosity, being lower than the viscosity of the crystalline matrix.

The MFR of the amorphous propylene ethylene elastomer may be in the range of 8.0-200 g/10 min, preferably in the range of 10.0-150 g/10 min, more preferably in the range of 12.0-100 g/10 min.

The amorphous propylene ethylene elastomer comprises propylene, ethylene and/or alpha-olefins as monomers.

The alpha-olefins may be selected from C4 to C8 alpha olefins, preferably from 1-butene or 1-hexene.

In a preferred embodiment, the amorphous propylene ethylene elastomer comprises ethylene and 1-butene as comonomers.

In an especially preferred embodiment, amorphous propylene ethylene elastomer comprises only ethylene as the sole comonomer.

In a particularly preferred embodiment the amorphous propylene ethylene elastomer consists of propylene and ethylene as sole monomers.

The comonomer content of the amorphous propylene ethylene elastomer is higher than of the crystalline matrix: the comonomer content of the amorphous propylene ethylene may be in the range of 9.0-25.0 wt.-%, preferably in the range of 12.0-23.0 wt.-%, more preferably in the range of 13.0-23.0 wt.-%.

(c) Nucleating Agent

The heterophasic polypropylene composition of the present invention may also comprise at least one nucleating agent (c) for the α- or γ-modification of crystalline polypropylene.

Said type of nucleating agent, commonly referred to as α-nucleating agent, may be present in a relative amount of 0.001-0.50 wt.-%

This at least one α-nucleating agent (c) may be selected from the groups of particular or soluble nucleating agents.

Preferred particular nucleating agents comprise the groups of (i) monocarboxylic acids and polycarboxylic acids, (ii) salts of diesters of phosphoric acid, and (iii) polymeric nucleating agents.

Soluble nucleating agents comprise (iv) sorbitol derivatives and (v) trisamide derivatives. Soluble nucleating agents are especially preferred.

Alternatively, this at least one α-nucleating agent (c) may be selected from the groups comprising (i) salts of monocarboxylic acids and polycarboxylic acids, e.g. sodium benzoate or aluminum tert-butylbenzoate; or 1,2-cyclohexane dicarboxylicacid Ca-salt, of which the 1,2-cyclohexane dicarboxylicacid Ca-salt is especially preferred;

(ii) salts of diesters of phosphoric acid, e.g. sodium 2,2'-methylenebis (4,6,-di-tert-butylphenyl) phosphate or aluminium-hydroxy-bis[2,2'-methylene-bis(4,6-di-t-butylphenyl)phosphate], and hydroxybis (2,4,8,10-tetra-tert-butyl-6-hydroxy-12Hdibenzo(d,g)(1,3,2) dioxaphosphocin 6-oxidato) aluminium, wherein hydroxybis (2,4,8,10-tetra-tert-butyl-6-hydroxy-12H-dibenzo(d,g)(1,3,2) dioxaphosphocin 6-oxidato) aluminium is preferred;

(iii) crystalline polymers, like poly(vinyl cyclohexane) (PVCH), poly(4-methyl pentene-1) (P4MP) and poly(tetrafluoro ethylene), where PVCH is preferred;

(iv) sorbitol derivatives, e.g. di(alkylbenzylidene)sorbitols as 1,3:2,4-dibenzylidene sorbitol, 1,3:2,4-di(4-methylbenzylidene) sorbitol, 1,3:2,4-di(4-ethylbenzylidene) sorbitol and 1,3:2,4-Bis(3,4-dimethylbenzylidene) sorbitol, as well as nonitol derivatives, e.g. 1,2,3-trideoxy-4,6;5,7-bis-O-[(4-propylphenyl)methylene] nonitol; and (v) benzene-trisamides like substituted 1,3,5-benzenetrisamides as N,N',N"-tris-tert-butyl-1,3,5-benzenetricarboxamide, N,N',N"-tris-cyclohexyl-1,3,5-benzene-tricarboxamide and N-[3,5-bis-(2,2-dimethyl-propionylamino)-phenyl]-2,2-dimethyl-propionamide.

It is especially preferred, that the at least one α-nucleating agent (c) in the heterophasic polypropylene composition of the present invention is selected from 1,3:2,4-25 dibenzylidene sorbitol, 1,3:2,4-Bis(3,4-dimethylbenzylidene) sorbitol, 1,2,3-trideoxy-4,6;5,7-bis-O-[(4-propylphenyl)methylene] nonitol and N-[3,5-bis-(2,2-dimethyl-propionylamino)-phenyl]-2,2-dimethyl-propionamide.

Physical Characterisation of the Heterophasic Polypropylene Composition

The heterophasic polypropylene composition of the present invention can be characterised by improved, well balanced mechanical properties.

The Flexural Modulus according to ISO178 may be 900 MPa or below, preferably in the range of 600-850 MPa, more preferably in the range of 650-800 MPa. The Notched Impact Strength (NIS) as determined according to ISO179/1 eA at +23° C. may be in the range of 4.0-40.0 kJ/m$^2$, preferably in the range of 4.5-30.0 kJ/m$^2$, more preferably in the range of 5.0-20.0 kJ/m$^2$.

The heterophasic polypropylene composition may be also characterised by its optical properties, namely its Haze, determined according to ASTM1003-D on 1 mm injection moulded plaques (Haze$_1$): Haze$_1$ may be in the range of up to 25.0%, preferably in the range of 2.0-22.0%, more preferably in the range of 5.0-19.0% Haze can also be determined on 0.3 mm thick bottles, denominated then as Haze$_B$. Haze$_B$ may be in the range of <25%, preferably in the range of 5.0-22.0, like 7.0-19.0%.

The heterophasic polypropylene composition furthermore has a very beneficial ratio of stiffness to haze, expressed by the optical performance index OPI and the optical performance index on bottles (OPIB)

OPI is determined by dividing the Flexural Modulus by Haze$_1$.

OPI$_B$ is determined by dividing the Flexural Modulus by Haze$_B$.

The optical performance index OPI may be at least 25 or higher, such as 35 or higher or 40 or higher. It may be in the range of 25-70, like preferably in the range of 35-60, more preferably in the range of 40-50.

The optical performance index on bottles (OPI$_B$) may at least 25 or higher, such as 35 or higher. The OPI$_B$ may be in the range of 25-70, like preferably in the range of 35-60.

Final articles like bottles or containers produced out of the heterophasic polypropylene composition are featured by an acceptable drop height and good top load as well as good optical properties before and after the sterilisation step.

Drop height may be in the range of 1.5-4.0 m, preferably in the range of 2.0-2.5 m. Top load may be in the range of at least 250 N, preferably in the range of 255-500 N, more preferably in the range of 260-450 N.

The optical properties (haze and clarity) before and after sterilisation were determined on 0.3 mm thick bottles as described in the experimental part.

Haze$_B$ b.s. denominates haze on bottles before sterilisation, Haze$_B$ a.s. denominates haze on bottles after sterilisation, Accordingly, clarity b.s. and a.s. denominate the respective values before and after sterilisation.

Both Haze$_B$ b.s. as Haze$_B$ a.s. may be—independently of each other—in the range of <25%, preferably in the range of. 5.0-22.0%, like 7.0-19.0%.

Both Clarity b.s. may be in the range of >45%, preferably in the range of 50-78%. Clarity a.s. may be in the range of >45%, preferably in the range of 50-78%.

The heterophasic polypropylene composition of the present invention may comprises usual additives, such as anti-oxidants, acid scavengers, UV-stabilisers or lubricants up to 5 wt.-%. Preferably the additive content is below 3.0 wt.-%, like below 1.0 wt.-%. It is understood, that said additives may be present, even when the heterophasic polypropylene composition is defined as "consisting" of various fractions.

Polymerisation Process

The present invention also discloses a process for polymerising the heterophasic polypropylene composition of the present invention.

The heterophasic polypropylene composition of the present invention is typically and preferably made in a multistep process well known in the art. A preferred multistage process is a loop-gas phase-process, such as developed by Borealis NS, Denmark (known as BORSTAR® technology) described e.g. in patent literature, such as in EP-A-0887379 or in WO 92/12182.

The invention preferably relates to the copolymerisation of propylene, ethylene and optionally further comonomers as defined above and below, in an at least three step process so as to form the heterophasic polypropylene composition. Preferably, propylene and ethylene are the only monomers used.

Ideally, the process of the invention employs three main reactors, a first reactor operating in bulk, a first gas phase reactor and a second gas phase reactor.

The process may also utilize a prepolymerisation step, taking place in a separate reactor before the three main reactors.

The first polypropylene fraction is being produced in a bulk step, then transferred to the second stage in which the second polypropylene fraction is prepared in a first gas phase reactor (GPR1) in the presence of the first polypropylene fraction.

This mixture, being the crystalline matrix and comprising said first and second polypropylene fractions together, is transferred to the third stage in which the amorphous propylene-ethylene elastomer is prepared in a gas phase reactor (GPR2) in the presence of the crystalline matrix.

For bulk and gas phase copolymerisation reactions, the reaction temperature used will generally be in the range 60 to 115° C. (e.g. 70 to 110° C.), the reactor pressure will generally be in the range 10 to 40 bar for gas phase reactions with bulk polymerisation operating at slightly higher pressures. The residence time will generally be 0.25 to 8 hours (e.g. 0.3 to 3 hours).

The MFR2 of the polymer produced in the first stage, being the first polypropylene fraction, may in the range of 2.0 to 10.0 g/10 min, the MFR2 of the polymer produced in the second stage, namely second polypropylene fraction, is in the range of 0.2 to less than 2.0 g/10 min, and the MFR2 of the polymer produced in the third stage, namely the amorphous propylene-ethylene elastomer is in the range of 8.0 to 200.0 g/10 min.

The comonomer content of the polymer produced in the first stage, namely the first polypropylene fraction, may be in the range of 0.0 to 1.0 wt.-%, preferably 0.0 wt.-%; the comonomer content of the polymer produced in the second stage, namely the second polypropylene fraction, may be in the range of more than 1.0 to 7.0 wt.-%, and the ethylene content of the polymer produced in the third stage, namely the amorphous propylene ethylene elastomer may be in the range of 9.0 to 25.0 wt.-%.

Catalysts:

The heterophasic polypropylene composition according to the invention is preferably obtainable by a single-site catalyst, more preferably being obtainable by a metallocene catalyst.

The metallocene catalyst is preferably according to the following formula (I).

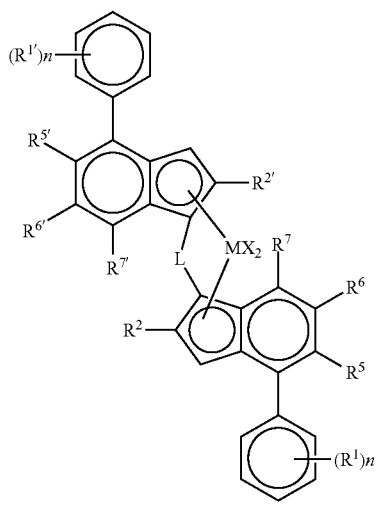

(I)

wherein M is Hf or Zr, preferably Zr,

X is a sigma ligand, preferably each X is independently a hydrogen atom, a halogen atom, C1-C6-alkoxy group, C1-C6-alkyl, phenyl or benzyl group, more preferably each X is independently Cl or a methyl group and most preferably each X is either Cl or a methyl group;

L is a bridge of the formula —SiR$^8_2$—, wherein each $R^8$ is independently a C1-C20-hydrocarbyl group, tri(C1-C20-alkyl)silyl, preferably each $R^8$ is independently a C1-C20-linear, branched or cyclic alkyl group, a C6-C20-aryl, C7-C20-arylalkyl or C7-C20-alkylaryl group, more preferably a C1-C20-linear, branched or cyclic alkyl group, even more preferably a linear or branched C1-C20 alkyl group or a C3-C10 cycloalkyl group, even more preferably a linear or branched C1-C6 alkyl group or a C3-C7 cycloalkyl group, e.g. methyl, ethyl, n-propyl, i-propyl, n-butyl or tert.butyl, even more preferably, both $R^8$ are the same and are selected from methyl, ethyl, npropyl, i-propyl, n-butyl or tert.-butyl, even more preferably methyl or ethyl, even more preferably both Ware methyl; n is 0, 1 or 2, preferably 1 or 2 and most preferably 1;

$R^1$ and $R^{1'}$ are the same or can be different and can be a linear or branched C1-C6-alkyl group, preferably linear or branched C1 to C4 alkyl group, e.g. methyl, tert.-butyl; $R^2$ and $R^{2'}$ are the same or can be different and are a CH2-$R^9$ group, with $R^9$ being H or linear or branched C1-C6-alkyl group, more preferably H or linear or branched C1-C3-alkyl, most preferably H; $R^5$ and $R^{5'}$ are the same or are different and can be H or a linear or branched C1-C6-alkyl group, e.g. methyl, ethyl, n-propyl, i-propyl, n-butyl, i-butyl, sec.-butyl and tert.-butyl, or a OR group, wherein R is a C1-C6-alkyl group, preferably H or a linear or branched C1-C4-alkyl group or a OR group, wherein R is a C1-C3-alkyl group; $R^6$ and $R^{6'}$ are the same or are different and can be H or a C($R^{10}$)3 group, with $R^{10}$ being the same or different and $R^{10}$ can be H or a linear or branched C1-C6-alkyl group, preferably H or a C($R^{10}$)$_3$ group, with $R^{10}$ being the same or different and $R^{10}$ can be a linear or branched C1C3-alkyl group;

or $R^5$ and $R^6$ and/or $R^{5'}$ and $R^{6'}$ taken together form an unsubstituted 4-7 membered ring condensed to the benzene ring of the indenyl moiety, preferably form an unsubstituted 5-6 membered ring condensed to the benzene ring of the indenyl moiety; and 5 $R^7$ and $R^{7'}$ can be the same or are different and can be H or a linear or branched C1-C6-alkyl group, more preferably H.

The single-site metallocene complex, especially the complexes defined by the formula (I) specified in the present invention, used for manufacture of the heterophasic propylene polymer (HECO) are symmetrical or asymmetrical. For asymmetrical complexes that means that the two indenyl ligands forming the metallocene complex are different, that is, each indenyl ligand bears a set of substituents that are either chemically different, or located in different positions with respect to the other indenyl ligand. More precisely, they are chiral, racemic bridged bis-indenyl metallocene complexes. Whilst the complexes of the invention may be in their syn-configuration, ideally they are in their anti-configuration. For the purpose of this invention, racemic-anti means that the two indenyl ligands are oriented in opposite directions with respect to the cyclopentadienyl-metalcyclopentadienyl plane, while racemic-syn means that the two indenyl ligands are oriented in the same direction with respect to the cyclopentadienyl-metal-cyclopentadienyl plane, as shown in the Figure below.

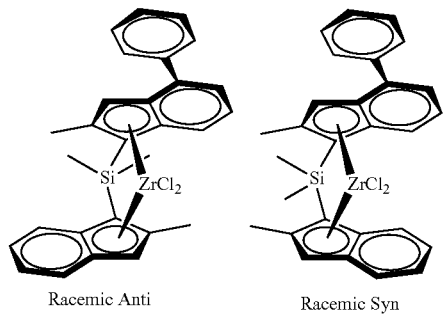

Racemic Anti         Racemic Syn

Formula (I) is intended to cover both, syn- and anti-configurations. By nature of their chemistry, both anti and syn enantiomer pairs are formed during the synthesis of the complexes. However, by using the ligands of this invention, separation of the 5 preferred anti-isomers from the syn-isomers is straightforward.

It is preferred that the metallocene complexes of the invention are employed as the racemic anti isomer. Ideally therefore at least 95% mol, such as at least 98% mol, especially at least 99% mol of the metallocene catalyst is in the racemic anti isomeric form. In a preferred embodiment at least one of the phenyl groups is substituted with at least one of $R^1$ or $R^{1'}$, thus n can be 0 only for one of the ligands and not for both. If n is 1, then $R^1$ and $R^{1'}$ are preferably on position 4 (para) of the phenyl ring and if n is 2 then $R^1$ and $R^{1'}$ are preferably on positions 3 and 5 of the phenyl ring. Different combinations for $R^1$ and $R^{1'}$ are possible. Both phenyl rings are substituted by $R^1$ and $R^{1'}$, whereby n can be the same or can be different for the two phenyl rings and is 1 or 2.

More preferably in the catalyst according to formula (I) M is Zr

X is independently a hydrogen atom, a halogen atom, or C1-C6-alkyl more preferably each X is independently Cl or a methyl group and most preferably each X is either Cl or a methyl group; L is a bridge of the formula —$SiR^8_2$—, wherein each $R^8$ is independently a linear or branched C1-C20 alkyl group, even more preferably a linear or branched C1-C6 alkyl group, e.g. methyl, ethyl, n-propyl, i-propyl, n-butyl or tert.-butyl, even more preferably, both $R^8$ are the same and are selected from methyl, ethyl, n-propyl, i-propyl, n-butyl or tert.-butyl, even more preferably methyl or ethyl, even more preferably both R8 are methyl; n is 1 or 2, preferably each n is 1; $R^1$ and $R^{1'}$ are the same or can be different and can be a linear or branched C1 to C4 alkyl group, e.g. methyl, tert.-butyl; $R^2$ and $R^{2'}$ are the same or can be different and are a $CH2$-$R^9$ group, with $R^9$ being H or linear or branched C1-C3-alkyl, most preferably H; $R^5$ and $R^{5'}$ are the same or are different and can be H or a linear or branched C1-C4-alkyl group, e.g. methyl, ethyl, n-propyl, i-propyl, n-butyl, i-butyl, sec.-butyl and tert.-butyl, or a OR group, wherein R is a C1-C3-alkyl group; R6 and R6' are the same or are different and can be H or a $C(R^{10})_3$ group, with $R^{10}$ being the same or different and $R^{10}$ can be H or a $C(R^{10})_3$ group, with $R^{10}$ being the same or different and $R^{10}$ can be a linear or branched C1-C3-alkyl group; or $R^5$ and $R^6$ and/or $R^{5'}$ and $R^{6'}$ taken together form an unsubstituted 5-6 membered ring condensed to the benzene ring of the indenyl moiety; and $R^7$ and $R^{7'}$ are H.

In one variant both of $R^5$ and $R^6$ as well as $R^{5'}$ and $R^{6'}$ together form an unsubstituted 4-7, preferably 5-6 membered ring condensed to the benzene ring of the indenyl moiety and, optionally and preferably, $R^2$ and $R^{2'}$ each is a C1 to C4 alkyl group, more preferably methyl group. More preferably both of $R^5$ and $R^6$ as well as $R^{5'}$ and $R^{6'}$ form an unsubstituted 5 membered ring condensed to the benzene ring of the indenyl moiety and optionally and preferably, $R^2$ and $R^{2'}$ each is a methyl group.

In another variant it is also possible that at both ligands $R^5$ and $R^6$ as well as $R^{5'}$ and $R^{6'}$ are hydrogen.

Still a further possibility is that only one of the ligands is unsubstituted in position 5 and 6.

In other words, $R^5$ and $R^6$ or $R^{5'}$ and $R^{6'}$ are hydrogen.

Articles:

The present invention also identifies moulded articles comprising the heterophasic polypropylene composition of the present invention. Such moulded articles may be produced by injection or blow moulding, preferably be extrusion blow moulding. Preferably, such extrusion blow moulded articles are bottles or containers, preferably bottles or containers for household or industrial chemicals, for cosmetics, for packaging, pharmaceutical, healthcare or medical applications or for alimentary applications. Especially preferred are so called squeezable articles, like soft bottles or ampoules and/or articles produced in the blow-fill-seal process.

In one embodiment of the instant invention, the extrusion blow moulded articles are bottles, ampoules or containers suitable for medical or healthcare applications, like blow, fill and seal applications. It is preferred that the containers or bottles have dimensions of up to 10 l, preferably 100 ml to 5 l, like 200 ml to 2 l, and/or a wall thickness of 0.1 to 1.2 mm, like 0.2 to 0.8 mm.

Equally preferred are ampoules, small containers or squeezable articles, having a volume of 1 to 100 ml, such as 2 to 75 ml, 3 to 50 ml or 5 to 30 ml.

Use

The heterophasic polypropylene composition of the present invention is useful for the production of blow moulded and injection moulded articles or containers, like bottles or ampoules or squeezable articles. It is especially useful for being converted into articles via the blow-fill-seal process.

The heterophasic polypropylene composition is further useful for producing articles intended for sterilisation processes, especially for steam sterilisation processes.

The heterophasic polypropylene composition is also useful for producing articles intended for alimentary, packaging, medical, healthcare, pharmaceutical or diagnostic applications The present invention will now be described in further detail by the examples provided below:

EXAMPLES

Measuring Methods

Melt Flow Rate

The melt flow rate (MFR) is determined according to ISO 1133 and is indicated in g/10 min. The MFR is an indication of the flowability, and hence the processability, of the polymer. The higher the melt flow rate, the lower the viscosity of the polymer. The $MFR_2$ of polypropylene is determined at a temperature of 230° C. and a load of 2.16 kg.

Differential Scanning Calorimetry (DSC)

Differential scanning calorimetry (DSC) analysis, melting temperature ($T_m$) and melt enthalpy ($H_m$), crystallization temperature ($T_c$), and heat of crystallization ($H_c$, $H_{CR}$) are measured with a TA Instrument Q200 differential scanning calorimetry (DSC) on 5 to 7 mg samples. DSC is run according to ISO 11357/part 3/method C2 in a heat/cool/heat cycle with a scan rate of 10° C./min in the temperature range of −30 to +225° C.

Crystallization temperature ($T_c$) and heat of crystallization ($H_c$) are determined from the cooling step, while melting temperature ($T_m$) and melt enthalpy ($H_m$) are determined from the second heating step.

Xylene Cold Soluble (XCS)

Xylene Cold Soluble fraction at room temperature (XCS, wt.-%) is determined at 25° C. according to ISO 16152; 5$^{th}$ edition; 2005-07-01.

Hexane Soluble Fraction (C6 FDA)

The amount of hexane extractable polymer according to FDA method (federal registration, title 21, Chapter 1, part 177, section 1520, s. Annex B) was determined from films produced on a PM30 cast film extrusion line with about 220° C. melt temperature with LID=20 and a screw diameter of 30 mm (feed zone 4 D long, 5.8 mm deep, compression zone 10 D long, metering zone 6 D long, 2.3 mm deep utilising a screen pack 36-400-900-400 mesh/cm$^2$.) A 200 mm die with a 0.55 to 0.60 mm die gap, screw speed: 50 r/min, and chill roll temperature of water: both rolls 40° C. (heating-cooling unit), Air gap: 0.5 mm, Air knife blower air supply: 1 bar. The film thickness is 100 µm.

The amount of hexane soluble polymer is determined according to FDA method (federal registration, title 21, Chapter 1, part 177, section 1520, s. Annex B) from the film samples prepared as described above. The extraction was performed at a temperature of 50° C. and an extraction time of 2 hours.

Steam Sterilisation

Steam sterilisation was performed in a Systec D series machine (Systec Inc., USA). The samples were heated up at a heating rate of 5° C./min starting from 23° C. After having been kept for 30 min at 121° C., they were removed immediately from the steam steriliser and stored at room temperature till processed further.

Crystalline and Soluble Fractions Method

The crystalline (CF) and soluble fractions (SF) of the polypropylene (PP) compositions as well as the comonomer content and intrinsic viscosities of the respective fractions were analysed by the CRYSTEX QC, Polymer Char (Valencia, Spain).

A schematic representation of the CRYSTEX QC instrument is shown in FIG. 1A. The crystalline and amorphous fractions are separated through temperature cycles of dissolution at 160° C., crystallization at 40° C. and re-dissolution in a 1,2,4-trichlorobenzene (1,2,4-TCB) at 160° C. as shown in FIG. 1B. Quantification of SF and CF and determination of ethylene content (C2) are achieved by means of an infrared detector (IR4) and an online 2-capillary viscometer which is used for the determination of the intrinsic viscosity (IV).

The IR4 detector is a multiple wavelength detector detecting IR absorbance at two different bands (CH3 and CH2) for the determination of the concentration and the ethylene content in Ethylene-Propylene copolymers. IR4 detector is calibrated with series of 8 EP copolymers with known ethylene content in the range of 2 wt.-% to 69 wt.-% (determined by 13C-NMR) and various concentration between 2 and 13 mg/ml for each used EP copolymer used for calibration.

The amount of Soluble fraction (SF) and Crystalline Fraction (CF) are correlated through the XS calibration to the "Xylene Cold Soluble" (XCS) quantity and respectively Xylene Cold Insoluble (XCI) fractions, determined according to standard gravimetric method as per ISO16152. XS calibration is achieved by testing various EP copolymers with XS content in the range 2-31 wt.-%.

The intrinsic viscosity (IV) of the parent EP copolymer and its soluble and crystalline fractions are determined with a use of an online 2-capillary viscometer and are correlated to corresponding IV's determined by standard method in decalin according to ISO 1628. Calibration is achieved with various EP PP copolymers with IV=2-4 dL/g.

A sample of the PP composition to be analysed is weighed out in concentrations of 10 mg/ml to 20 mg/ml. After automated filling of the vial with 1,2,4-TCB containing 250 mg/l 2,6-tert-butyl-4-methylphenol (BHT) as antioxidant, the sample is dissolved at 160° C. until complete dissolution is achieved, usually for 60 min, with constant stirring of 800 rpm.

As shown in a FIGS. 1A and 1B, a defined volume of the sample solution is injected into the column filled with inert support where the crystallization of the sample and separation of the soluble fraction from the crystalline part is taking place. This process is repeated two times. During the first injection the whole sample is measured at high temperature, determining the IV [dl/g] and the C2 [wt.-%] of the PP composition. During the second injection the soluble fraction (at low temperature) and the crystalline fraction (at high temperature) with the crystallization cycle are measured ([wt.-%] SF, [wt.-%] C2, IV).

Dynamic Mechanical Thermal Analysis (DMTA)

The glass transition temperature Tg is determined by dynamic mechanical thermal analysis (DMTA) according to ISO 6721-7. The measurements are done in torsion mode on compression moulded samples (40×10×1 mm3) between −100° C. and +150° C. with a heating rate of 2° C./min and a frequency of 1 Hz. Storage modulus G' is determined at +23° C. according ISO 6721-7:1996. The measurements are done in torsion mode on compression moulded samples (40×10×1 mm3) between −150° C. and +150° C. with a heating rate of 2° C./min and a frequency of 1 Hz.

Flexural Modulus

The flexural modulus was determined in 3-point-bending at 23° C. according to ISO 178 on 80×10×4 mm$^3$ test bars injection moulded in line with EN ISO 1873-2.

Notched Impact Strength (NIS):

The Charpy notched impact strength (NIS) was measured according to ISO 179 1 eA at +23° C., using injection moulded bar test specimens of 80×10×4 mm$^3$ prepared in accordance with EN ISO 1873-2.

Haze and Clarity

Haze was determined according to ASTM D1003-00 on 60×60×1 mm$^3$ plaques injection moulded in line with EN ISO 1873-2. Haze$_1$ denominates a haze value determined on 1 mm thick plaques.

Clarity, and Haze Measurement on 0.3 mm Thick EBM Bottles

Clarity and haze of bottles were determined according to ASTM D1003.

The measurement is done on the outer wall of the bottles. The top and bottom of the bottles are cut off. The resulting round wall is then split in two, horizontally. Then from this wall six equal samples of app. 60×60 mm are cut from close to the middle. The specimens are placed into the instrument with their convex side facing the haze port. Haze and clarity are measured for each of the six samples. The reported value is the average of these six parallels.

The Haze values determined on the bottles are indicated as Haze B.

Optical performance Index (OPI)

The Optical performance Index (OPI) indicates the ratio Flexural Modulus to Haze$_1$, alternatively, the OPI on bottles is determined by the ratio of the Flexural Modulus to Haze value as determined on 0.3 mm thick bottles (Haze$_B$).

Accordingly.

OPI=Flexural Modulus/Haze$_1$

OPI$_B$=Flexural Modulus/Haze$_B$

Drop Test on Bottles

For determining the drop height each bottle as defined below is dropped several times in a row from increasing heights. The test is stopped for each bottle when fracture occurs. The drop test is performed on the extrusion blow moulded 1 l bottles with a wall thickness of 0.6 mm as described below. The bottles are filled up to their shoulder with water. For each test series at least 12 bottles are required. 4 bottles are dropped simultaneously from a starting height which is chosen according to the following table, where the expected fracture drop height has been determined in pre-tests or has been chosen from experience:

TABLE 1

| Test settings for drop height | | | |
|---|---|---|---|
| Expected fracture drop height [m] | 0.3-1.0 | 1.0-2.5 | 2.5-5.0 |
| Starting drop height [m] | 0.2 | 0.5 | 2.0 |
| Increment [m] | 0.1 | 0.25 | 0.25 |

Those bottles that show fracture are discarded and the test is continued with the remaining bottles at increasing heights. The increments to increase the drop height are indicated in Table 1 above. The fracture drop height is noted for each bottle and the average fracture drop height is calculated according to the following formula:

$$h_p = \Sigma(h_i)/n_g$$

wherein $h_p$=average fracture drop height
$h_i$=individual fracture drop height
$n_g$=total number of dropped containers.

Top Load (Max Force)

Top load determines the deformation force at 1 mm, 2 mm and 3 mm deformation of the round bottle. Additionally the maximum force Fmax and the deformation in mm at Fmax are determined. The bottles have a height of 204 mm and a wall thickness of 0.6 mm (as defined below). Before testing, the bottles are conditioned for 7 days at 23° C. and a relative humidity of 50% (+/−5%). The burr of the bottle orifice is removed. Top load is tested at universal testing machine of the class 1 according to DIN 51221. Bottles to be tested are put between two parallel buffed plates of hardened steel, one plate is fixed and the other plate is moving. Force is recorded and results are given as $F_{max}$ (N) and Deformation at Maximum Force (mm). Eight bottles are tested with speed of 10 mm/min by using 2.5 kN load cell. The final result is the average of said eight bottles.

Description of the Bottles used for Drop Height and Top Load-Tests 1 l bottles, having an outer diameter of 90 mm, a wall thickness of 0.6 mm, an overall-height of 204 mm and a height of the cylindrical mantle of 185 mm were produced by extrusion blow moulding on a B&W machine with a single screw extruder using a melt temperature of 190° C. and a mould temperature of 15° C.

Material Description:

Catalyst

The catalyst for producing the heterophasic polypropylene component of IE1 and IE2 was rac-anti-Me₂Si(2-Me-4-(p-tBuPh)-Ind)(2-Me-4-Ph-5-OMe-6-tBu-Ind)ZrCl₂ prepared as described in WO2013007650.

Preparation of the Solid Catalyst System for IE1 and IE2

Inside the glovebox, 80 μL of a dry and degassed mixture of perfluoroalkylethyl acrylate ester were mixed in a septum vial with 2 mL of a 30 wt-% solution of MAO in toluene and left to react overnight. The following day, 58.9 mg of the metallocene rac-anti-Me2Si(2-Me-4-Ph-6-tBu-Ind)(2-Me-4-Ph-5-OMe-6-tBu-Ind)ZrCl₂ (0.076 mmol, 1 equivalent) were dissolved with 4 mL of the MAO solution in another septum bottle and left to stir inside the glovebox. After 60 minutes, the 4 mL of the MAO-metallocene solution and 1 mL of the perfluoroalkylethyl acrylate ester mixture in MAO solution were successively added into a 50 mL emulsification glass reactor containing 40 mL of hexadecafluoro-1,3-dimethylcyclohexane kept at −10° C. and equipped with an overhead stirrer (stirring speed=600 rpm). Total amount of MAO is 5 mL (300 equivalents). A red emulsion formed immediately (measured emulsion stability=16 seconds) and was stirred during 15 minutes at 0° C./600 rpm. Then the emulsion was transferred via a 2/4 teflon tube to 100 mL of hot hexadecafluoro-1,3-dimethylcyclohexane heated to 90° C., and stirred at 600 rpm until the transfer is completed. The speed was reduced to 300 rpm. After 15 minutes stirring, the oil bath was removed and the stirrer turned off. The catalyst was left to settle up on top of the hexadecafluoro-1,3-dimethylcyclohexane and after 35 minutes the solvent was siphoned off. The remaining red catalyst was dried during 2 hours at 50° C. over an argon flow. 0.62 g of a red free flowing powder was obtained.

Polymerization

Polymerization was performed in a Borstar pilot plant, comprising a prepolymerisation reactor, a loop reactor and two gas phase reactors. The polymerisation conditions are indicated in Table 2. The properties of IE and CE are listed in Table 3.

The polymer used in IE1 and IE2 was compounded in a co-rotating twin-screw extruder Coperion ZSK 57 at 220° C. with 0.2 wt.-% of Irganox B225 (1:1-blend of Irganox 1010 (Pentaerythrityl-5 tetrakis(3-(3',5'-di-tert.butyl-4-hydroxytoluyl)-propionate and tris (2,4-di-t-butylphenyl) phosphite) of BASF AG, Germany) and 0.1 wt.-% calcium stearate.

IE2 was nucleated with 1700 ppm Millad 3988 (1,3:2,4 di(methylbenzylidene) sorbitol), commercially available by Milliken.

CE1 is a comparative random-heterophasic copolymer based on a Ziegler-Natta type catalyst (ZNC) as described in WO 2017005667 A1.

CE2 is the commercial grade LE6609-PH available from Borealis AG, Austria and is a low density polyethylene (LDPE) having a density of 930 kg/m³ and an MFR (190° C./2.16 kg) of 0.3 g/10 min.

Preparation of the Bottles

Bottles of 1 litre capacity were produced on a "Fischer Müller" Blow Moulding Machine. The main processing parameters for the production were:

Temperature profile: 180 to 200° C. applied in extruder, adapter and head
Melt temperature measured: 190° C.
Speed of extruder (revolution per minute; rpm): 13 to 16 rpm
Die gap for producing 0.6 mm thick bottles was adjusted to get a bottle with a weight of 40 g with the commercial Borealis grade RB307MO (random propylene copolymer with a density of 902 kg/m³ and an MFR₂ of 1.5 g/10 min)
Cycle time: 12 to 16 seconds
For producing 0.3 mm thick bottles, the die gap was adjusted to get a bottle with a weight of 25 g with the commercial Borealis grade RB307MO.

The bottles had an outer diameter of 90 mm, wall thickness of 0.3 mm or 0.6 mm respectively, an overall-height of 204 mm and a height of the cylindrical mantle of 185 mm.

TABLE 2

| Polymerisation details of the inventive example IE1 the comparative example CE1: | | | |
|---|---|---|---|
| | | IE1 | CE1 |
| Prepolymerisation | | | |
| Al/Ti | mol/mol | — | 210 |
| Al/Donor | mol/mol | — | 7.7 |
| Temp | ° C. | 20 | 30 |

TABLE 2-continued

Polymerisation details of the inventive example IE1 the comparative example CE1:

|  |  | IE1 | CE1 |
|---|---|---|---|
| Res. time | h | 0.4 | 0.33 |
| Loop |  |  |  |
| Temp | °C. | 75 | 70 |
| H2/C3 | mol/kmol | 0.2 | 1.13 |
| C2/C3 | mol/kmol | 0 | 4.57 |
| MFR | g/10 min | 5.6 | 5.7 |
| XCS | wt.-% | 0.6 | 4.8 |
| C2 | wt.-% | 0 | 2.1 |
| Split | wt.-% | 39 | 40 |
| GPR1 |  |  |  |
| Temp | °C. | 80 | 80 |
| C2/C3 | mol/kmol | 120 | 40.6 |
| H2/C3 | mol/kmol | 1.6 | 2.8 |
| MFR | g/10 min | 1.6 | 1.9 |
| XCS | wt.-% | 3.5 | 15.6 |
| C2 | wt.-% | 1.9 | 5.6 |
| Split | wt.-% | 48 | 47 |
| MFR in GPR1 | g/10 min | 0.6 | 0.8 |
| C2 in GPR1 | wt.-% | 3.5 | 10.2 |
| GPR2 |  |  |  |
| Temp | °C. | 70 | 75 |
| C2/C3 | mol/kmol | 575 | 104 |
| H2/C2 | mol/kmol | 2.5 | 103 |
| MFR | g/10 min | 2.1 | 1.4 |
| XCS | wt.-% | 17.6 | 31.2 |
| C2 | wt.-% | 4.5 | 8.1 |
| Split | wt.-% | 13 | 13 |
| MFR in GPR2 | g/10 min | 14 | 0.2 |
| C2 in GPR2 | wt.-% | 21.9 | 24.5 |
| Co(XCS) | wt.-% | 13.4 | 17.6 |
| iV(XCS) | dl/g | 1.6 | 2.6 |

The person skilled is aware, that the polymer fraction produced in GPR1 is produced in the presence of the preceding polymer fraction produced in the loop and accordingly cannot be analysed as such. Hence, it is clear that the properties C2 in GPR1 or GPR2 and MFR in GPR1 or GPR2 have been calculated based on the available figures for the material coming from the preceding reactor and the values as determinable or determined on the polymer as available at the end of said polymerisation step or as of the final polymer.

TABLE 3

Mechanical properties of the inventive and comparative examples

|  |  | IE1 | IE2 | CE1 | CE2 |
|---|---|---|---|---|---|
| MFR | g/10 min | 2 | 2 | 1.4 | 1.2 |
| XCS | wt.-% | 14.4 | 14.4 | 31.2 | 0.9 |
| C2(total) | wt.-% | 4.5 | 4.5 | 8.1 | 100 |
| C2(XCS) | wt.-% | 13.4 | 13.4 | 17.3 | 100 |
| IV(XCS) | dl/g | 1.6 | 1.6 | 2.6 | — |
| XCS/Co(XCS) |  | — | 1.1 | 1.8 | 0.01 |
| SF | wt.-% | 12.5 | 12.5 | 27.3 | n.d. |
| C2 | wt.-% | 4.4 | 4.4 | 8.1 | n.d. |
| C2(SF) | wt.-% | 15.5 | 15.5 | 17.5 | n.d. |
| C2(CF) | wt.-% | 3.5 | 3.5 | 5.0 | n.d. |
| IV | dl/g | 2.4 | 2.4 | 2.7 | n.d. |
| IV(SF) | dl/g | 1.6 | 1.6 | 2.3 | n.d. |
| IV(CF) | dl/g | 2.4 | 2.4 | 2.8 | n.d. |
| Tm(PE) | °C. | — | — | 117 | 117 |
| Hm(PE) | J/g | — | — | 3.9 | 149 |
| Tm(PP) | °C. | 153 | 154 | 148 | — |
| Hm(PP) | J/g | 71 | 72 | 63 | — |
| Tc | °C. | 103 | 110 | 110 | 104 |
| G' | MPa | 396 | 423 | 245 | 250 |

TABLE 3-continued

Mechanical properties of the inventive and comparative examples

|  |  | IE1 | IE2 | CE1 | CE2 |
|---|---|---|---|---|---|
| Tg1 | °C. | −6.4 | −6.4 | −7.9 | — |
| Tg2 | °C. | — | — | −46 | −105 |
| C6 FDA | wt.-% | 0.6 | 0.6 | 3.28 | 0.8 |
| Flexural Modulus | MPa | 700 | 753 | 467 | 470 |
| NIS/23° C. | kJ/m$^2$ | 25.2 | 28.1 | 76.8 | 73.6 |
| NIS/−20° C. | kJ/m$^2$ | n.d. | 1.5 | 1.1 | 7.6 |
| Haze$_1$ | % | 16 | 14 | 29 | 76 |
| Optical Performance OPI Flex/Haze$_1$ Bottle/0.6 mm |  | 44 | 54 | 16 | 6 |
| Drop height | m | 2.0 | 2.2 | 5.5 | 2.2 |
| top load Bottle/0.3 mm | N | 281 | — | 213 | 131 |
| Haze$_B$ b.s.* | % | 19 | 16 | 32 | 33 |
| Clarity b.s. | % | 72 | 75 | 62 | 86 |
| Haze$_B$ a.s.* | % | 19 | 18 | 26 | n.d. |
| Clarity a.s. | % | 75 | 73 | 66 | n.d. |
| OPI$_B$ Flex/Haze$_B$ |  | 37 | 47 | 15 | 14 |

*a.s.: after sterilisation
*b.s.: before sterilisation

The invention claimed is:

1. A heterophasic polypropylene composition comprising:
   a. a crystalline matrix being a multimodal propylene random copolymer of ethylene and/or C4-C12 alpha-olefin(s) as further comonomers and
   b. an amorphous propylene-ethylene elastomer optionally comprising of C4-C12 alpha-olefin(s) as further comonomers dispersed in said crystalline matrix (a),
   wherein the heterophasic polypropylene composition is characterised by
      i. a xylene cold solubles (XCS) fraction according to ISO 1652 in the range of 5.0 to 16.5 wt. %,
      ii. an comonomer content of the XCS fraction (Co(XCS)) in the range of 8.0 to 16.5 wt. %,
      iii. and optionally fulfilling the inequation $$0.80 \leq XCS/Co(XCS) \leq 1.20,$$

wherein XCS denominates the xylene cold solubles fraction according to ISO 1652 in [wt. %] and Co(XCS) is the comonomer content of said XCS fraction in [wt. %].

2. The heterophasic polypropylene composition according to claim 1 comprising:
   a. 80.0-90.0 wt. % of a crystalline matrix being a multimodal propylene random copolymer of ethylene and/or C4-C12 alpha-olefin(s) as further comonomers and
   b. 10.0-20.0 wt. % of an amorphous propylene-ethylene elastomer optionally comprising of C4-C12 alpha-olefin(s) as further comonomers dispersed in said crystalline matrix (a).

3. The heterophasic propylene composition according to claim 2, wherein the multimodal propylene random copolymer of ethylene and or alpha-olefins (a) comprises:
   a1) 30.0-50.0 wt. %, based on the total weight of the heterophasic polypropylene composition, of a first polypropylene fraction being a propylene homopolymer or propylene-ethylene random copolymer,
   optionally having a comonomer content in the range of 0.0-1.0 wt. %, and/or
   a melt flow rate MFR2 in the range of 2.0-10.0 g/10 min, and a2) 30.0-60.0 wt. %, based on the total weight of the heterophasic polypropylene composition, of a second polypropylene fraction being a propylene-ethylene random copolymer, and optionally having a comonomer content in the range of above 1.0-7.0 wt. %, and/or a melt flow rate MFR2 in the range of 0.2-2.0 g/10 min.

4. The heterophasic propylene composition according to claim 1, wherein the heterophasic propylene composition comprises an intrinsic viscosity (IV) of the XCS fraction as determined according to DIN ISO 1628/1 in Decalin at 135° C. of less than 2.0 dl/g.

5. The heterophasic propylene composition according to claim 1 wherein, a hexane-soluble fraction of at most 1.5 wt. % when determined according to FDA method and/or a comonomer content of 1.0-7.0 wt. %.

6. The heterophasic propylene composition according to claim 1 further comprising a 0.001-0.50 wt. % of an alpha-nucleating agent and/or having a MFR230/2.16 according to ISO1133 in the range of 0.3-3.5 g/10 min.

7. The heterophasic propylene composition according to claim 1, having a melting point Tm of at least 145° C. and one glass transition temperature Tg in the range of (−15) to 0° C.

8. The heterophasic polypropylene composition according to claim 1, comprising a flexural Modulus according to ISO178 of at least 900 MPa and/or Notched Impact Strength NIS determined according to ISO179/1 eA at +23° C. of 4.0-40.0 kJ/m$^2$.

9. The heterophasic polypropylene composition according to claim 1, consisting of a Haze$_1$ of at most 20.0% when measured according to ASTM D1003 on 1 mm injection moulded plaques.

10. A process for preparing the heterophasic polypropylene composition according to claim 1 by sequential polymerisation in the presence of a metallocene catalyst, wherein:

preparing a first polypropylene fraction being a propylene homopolymer or a propylene-ethylene random copolymer in a bulk phase reactor in a first polymerisation stage, transferring said first polypropylene fraction to a second polymerisation stage in which a second polypropylene fraction being a propylene-ethylene random copolymer is prepared in a gas phase reactor (GPR1), transferring the mixture comprising said first and second polypropylene fraction together to the third polymerisation stage in which the amorphous propylene ethylene elastomer is prepared in a gas phase reactor (GPR3), and subjecting the mixture of said three polymers to a deactivation and purification step followed by compounding and pelletization.

11. The process according to claim 10, wherein the:

MFR2 of the first polypropylene fraction produced in the first stage is in the range of 2.0 to 10.0 g/10 min, the MFR2 of the second polypropylene fraction produced in the second stage is in the range of 0.2 to less than 2.0 g/10 min, and the MFR2 of the amorphous propylene ethylene elastomer produced in the third stage is in the range of 8.0 to 200.0 g/10 min.

12. The process according to claim 10, wherein:

the ethylene content of the first polypropylene fraction produced in the first stage is in the range of 0.0 to 1.0 wt. %, the ethylene content of the second polypropylene fraction produced in the second stage is in the range of more than 1.0 to 7.0 wt. %, and the ethylene content of the amorphous propylene ethylene elastomer produced in the third stage is in the range of 9.0 to 25.0 wt. %.

13. A heterophasic polypropylene composition produced according to claim 10.

14. A moulded article comprising the heterophasic polypropylene composition according to claim 1.

15. The moulded article of claim 13, being used for alimentary, packaging, medical, healthcare, pharmaceutical or diagnostic applications.

16. The moulded article according to claim 14, wherein the moulded article is a container, a bottle, or an ampoule.

* * * * *